Nov. 5, 1946.  I. E. McCABE  2,410,546
VALVE CONSTRUCTION
Filed Aug. 24, 1944
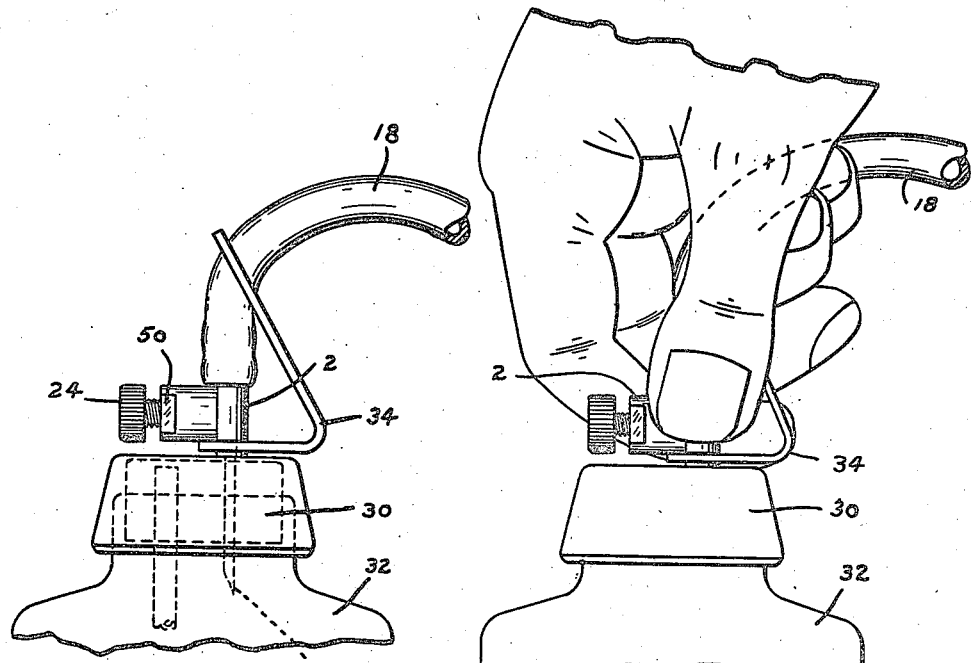
Fig. 1
Fig. 2
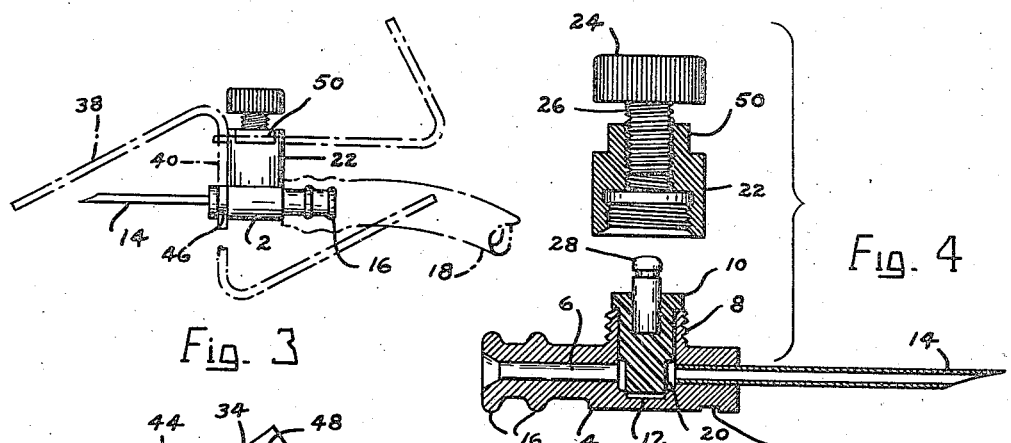
Fig. 3
Fig. 4
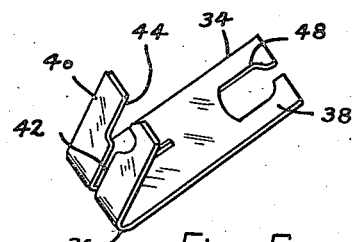
Fig. 5
INVENTOR.
IRA E. McCABE
BY Wilkinson Huxley Byron & Knight Patented Nov. 5, 1946

2,410,546

UNITED STATES PATENT OFFICE 2,410,546

VALVE CONSTRUCTION

Ira E. McCabe, Chicago, Ill.

Application August 24, 1944, Serial No. 550,940

3 Claims. (Cl. 128—214)

The present invention relates to valve structures adapted for use in connection with the control of fluid mediums to a very minute degree, such as in vacuum lines and in the medical field for blood collection and plasma or serum aspiration.

Among the objects of the present invention is to provide a novel valve assembly of simple and compact construction characterized as including an attachment adapted to serve in various capacities in the use and maintenance of the said valve.

The present invention has to do particularly with a valve structure embodying various valve parts, a puncturing needle and means for connecting the same to a flexible conduit or the like and which valve is adapted to be used in connection with a fluid source or receiver to be controlled, such as a plasma or blood donor bottle. Such valve mechanisms, as is well known, form a part of mobile or field medical units where it is necessary to have the same available in usable condition at all times and which are readily and easily manipulatable and placed in operable condition without loss of time. Such rigid conditions require a valve of simplified construction, compact and of relatively small dimensions, and being so constructed that all of the parts thereof may be easily and readily assembled and disassembled because of the frequent necessity for cleaning and sterilizing the parts thereof. As a further essential requirement, it is necessary to provide a structure in which the puncturing needle is amply protected during the cleaning and sterilizing operation. As a further requirement, the valve structure must be such as to be easily and readily grasped for puncturing a container and it is further necessary to prevent kinking of the flexible conduit attached thereto in order to provide for unrestricted flow of fluid therethrough.

It is, accordingly, an object of the present invention to provide a valve structure or assembly meeting the above requirements and which is characterized as embodying as a component part thereof a readily detachable attachment forming a part of the valve structure at all times but which has a multiplicity of uses in the valve assembly.

More particularly, the present invention has as an object the idea of providing an attachment for a valve as above described adapted to serve as a means for assembling and disassembling the valve and which in another of its capacities serves as a protecting medium for the puncturing needle when the valve is not in use. As an additional function, the said attachment is adapted to serve in the capacity of a supporting bracket for the flexible conduit attached to the body of the valve to assure proper flow of fluid therethrough and which said bracket additionally provides means readily grasped by the operator to facilitate attaching the valve to a container or the like.

Other objects, features, capabilities and advantages are comprehended by the invention, as will later appear and as are inherently possessed thereby.

Referring to the drawing—

Figure 1 is a view in side elevation of a valve structure made in accordance with the present invention, showing the same attached to a container in operative relation thereto;

Figure 2 is a view similar to Figure 1 showing the manner of attaching the valve structure to the container;

Figure 3 is a view in elevation of the valve structure as shown in Figure 1 of the drawing, disclosing more in detail the various uses to which the attachment can be put;

Figure 4 is a exploded view in cross-section of the valve structure of Figure 1 of the drawing; and Figure 5 is a view in perspective of the valve attachment forming a part of the valve assembly.

Referring now more in detail to the drawing, a valve structure made in accordance with the present invention is generally represented as 2 in the drawing and comprises a body 4 of generally cylindrical shape having the longitudinal bore or opening 6 extending therethrough and which body is further formed with an integrally and laterally extending fitting 8 in which is mounted a valve member 10 having seating relation with a valve seat as at 12 in the main part of the valve body. Mounted within one end of the valve body is a puncturing needle 14, the other end of the valve body being formed with a plurality of shoulders, such as 16, adapted to receive and hold in fluid-tight engagement therewith a flexible conduit or the like 18.

The valve member 10 is of resilient construction and is disposed within the laterally extending bore or opening 20 of the extension 8, the said extension 8 being embraced by the valve cap 22 in threaded relation thereto. Mounted within the cap 22 is an adjusting knob 24 whose shank 26 is threadedly adjustable within the cap and which is adapted to engage the compression pin 28 carried by the valve member 10 and which, through the medium of the shank 26, is adapted to control the movement of the valve member with respect to the opening through the valve body.

As more particularly shown in Figure 1 of the drawing, the puncturing needle 14 is adapted to be inserted through the closure element 30 of a plasma or blood donor bottle 32 or the like for introducing fluid such as plasma or blood into the bottle or receptacle 32. As will be clearly appreciated, the control of fluid flow is effected through the adjustment of the adjusting knob 24.

The present invention is particularly directed to a valve assembly embodying in its structure an attachment generally referred to as 34 which has a multiplicity of uses in connection with the valve under various circumstances. This attachment is in the form of a sheet of material bent as at 36 to provide a leg part 38 and a leg part 40, the latter being formed with a slot 42 extending into the leg part 38 and which is enlarged as at 44 adjacent the ends of the elements forming the leg to provide a spring connection whereby the attachment may be secured in a plurality of positions with respect to the body, the said enlarged slot portion 44 engaging in the annular groove 46 of the valve body when in either of two positions.

In one of said positions, the said attachment is so disposed as to facilitate introduction of the puncturing needle 14 into the closure 30, as more particularly shown in Figure 2 of the drawing. The disposition of the attachment is such that the valve assembly may be readily grasped for this operation, as well as for removal of the valve from the closure element 30 after the fluid has been drawn into said receiver. By virtue of the readily detachable attachment 34, the valve and its parts may be of simplified construction and of relatively small dimensions, thus resulting in relatively low manufacturing cost, yet providing a valve mechanism which can be readily manipulated at all times.

The leg part 38 is provided with the slot or opening 48 adjacent its end which, when the attachment is in the position shown in Figure 1, is adapted to receive the flexible conduit 18 and to prevent its kinking.

As hereinbefore suggested, the valve assembly according to the present invention when used in the medical field must be frequently disassembled for cleaning and sterilization and the parts reassembled for further use. During the time when the valve is not in use, and particularly where the same is undergoing sterilization and is being handled, it is desirable to provide a shield or protecting element for the said needle to prevent its injury. Accordingly, the attachment 34 is so constructed and attached to the valve body at the partially annular recess 46 that the said leg part 38 is in a position to protect the needle at all times, as clearly shown in Figure 3 of the drawing.

In addition to the above enumerated uses for the attachment 34, the said slot or opening 48 is so designed as to engage the opposed flat surfaces 50 of the tool engaging portion of the valve cap 22, as more particularly shown in Figure 3 of the drawing, whereby the various parts of the valve mechanism may be readily and easily assembled and disassembled. In assembling the valve, the member 10 including the compression pin 28 is inserted in the valve body as shown in Figure 4. The knob 24 is turned well out of the cap 22 and the latter is then pressed on the fitting 8 to engage the threaded exterior thereof. The cap is threadedly secured to the fitting by rotation of the cap and the attachment 34 provides a readily accessible tool for the cap to facilitate turning of the same. The attachment can be used to threadedly secure the cap to the valve body for assembling the parts or for removing the cap to disassemble the parts.

It will be noted that the attachment forms a part of the valve assembly at all times so that the same is always available for use in one or more of its capacities as above explained. This feature of construction is of particular advantage in the various uses to which the valve assembly is put, inasmuch as the valve can be properly maintained in operative position and is ready for instant use at a moment's notice.

While I have herein described and upon the drawing shown an illustrative embodiment of the invention, it is to be understood that the invention is not limited thereto but may comprehend other constructions, arrangements of parts, details and features without departing from the spirit of the invention.

What is claimed is:

1. In valve structure of the character described, in combination, a valve body having means at one end for receiving a flexible conduit, an attachment of generally angular shape adapted to be releasably fixed to said valve body in a plurality of positions, said attachment having an aperture of fixed size at one end and having clamping means at its other end, said clamping means having releasable securement to the valve body whereby the attachment is clamped to the valve body and solely supported thereon in either of said plurality of positions, and said attachment in one of said positions locating the aperture of fixed size to receive the flexible conduit thereby providing a non-kinking support for the conduit.

2. In valve structure of the character described, in combination, a valve body having means at one end for receiving a flexible conduit, a valve member disposed within the valve body, a valve cap threadedly secured to a portion of said valve body for sealing said member in operative position, said valve cap having a tool engaging portion provided with at least one flat surface, an attachment adapted to be releasably fixed to said valve body in a plurality of positions, said attachment having an aperture of fixed size at one end and having clamping means at its other end, said clamping means having releasable securement to the valve body whereby the attachment is clamped to the valve body and solely supported thereon in either of said plurality of positions, said attachment in one of said positions locating the aperture of fixed size to receive the flexible conduit thereby providing a non-kinking support for the conduit, and said aperture of fixed size having a shape complementary to the tool engaging portion of the valve cap.

3. In valve structure of the character described, in combination, a valve body provided with means for receiving at least one flexible conduit, a valve member disposed within the valve body, a valve cap threadedly secured to a portion of said valve body for sealing said member in operative position, said valve cap having a tool engaging portion provided with at least one flat surface, an attachment of generally angular shape adapted to be releasably fixed to said valve body, said attachment having an aperture of fixed size at one end and the other end being bifurcated to provide spring fingers forming clamping means, said clamping means having releasable securement to the valve body to position the aperture of fixed size for receiving the flexible conduit thereby providing a non-kinking support for the conduit, and said aperture of fixed size having a shape complementary to the tool engaging portion of the valve.

IRA E. McCABE.